(12) United States Patent
Mazzarese et al.

(10) Patent No.: US 7,933,357 B2
(45) Date of Patent: Apr. 26, 2011

(54) APPARATUS AND METHOD FOR TRANSMISSION AND RECEPTION IN A MULTI-USER MIMO COMMUNICATION SYSTEM

(75) Inventors: David Mazzarese, Suwon-si (KR);
Sung-Ryul Yun, Suwon-si (KR);
Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1100 days.

(21) Appl. No.: 11/709,339

(22) Filed: Feb. 21, 2007

(65) Prior Publication Data
US 2007/0211823 A1  Sep. 13, 2007

(30) Foreign Application Priority Data

Feb. 21, 2006 (KR) ............... 10-2006-0016805
Jan. 12, 2007 (KR) ............... 10-2007-0003750

(51) Int. Cl.
*H04L 27/00* (2006.01)
*H04J 11/00* (2006.01)
*H04W 4/00* (2009.01)
*H04M 1/00* (2006.01)

(52) U.S. Cl. ........ 375/299; 375/260; 375/295; 370/203; 370/206; 370/208; 370/210; 370/328; 370/329; 455/101; 455/561; 455/562.1

(58) Field of Classification Search ............. 375/221, 375/260, 299, 295; 455/69, 73, 101, 403, 455/561, 562.1; 370/206, 208, 203, 210, 328, 329

See application file for complete search history.

(56) References Cited

U.S. PATENT DOCUMENTS

| | | | |
|---|---|---|---|
| 7,336,727 B2 * | 2/2008 | Mukkavilli et al. | 375/299 |
| 2005/0025039 A1 * | 2/2005 | Hwang et al. | 370/206 |
| 2005/0265436 A1 * | 12/2005 | Suh et al. | 375/221 |
| 2006/0072677 A1 * | 4/2006 | Kwak et al. | 375/260 |
| 2007/0191066 A1 * | 8/2007 | Khojastepour et al. | 455/562.1 |

FOREIGN PATENT DOCUMENTS

| | | |
|---|---|---|
| KR | 1020050019265 | 3/2005 |
| KR | 1020050058269 | 6/2005 |

* cited by examiner

*Primary Examiner* — Mohammad H Ghayour
*Assistant Examiner* — Eboni Giles
(74) *Attorney, Agent, or Firm* — The Farrell Law Firm, P.C.

(57) ABSTRACT

An apparatus and method for transmission and reception in a multi-user Multiple-Input Multiple-Output (MIMO) communication system are provided. In a transmitter, a filter portion receives quantized Channel State Information (CSI) and Channel Quality Information (CQI) from a receiver, calculates a transmit filter value using on the quantized CSI and the CQI, determines an appropriate AMC level for the receiver, and sends a pilot signal including the transmit filter value and information about the determined AMC level on subcarriers in one of a preamble and data symbols. An antenna is used to send the output of the filter portion and receives data from the receiver.

30 Claims, 12 Drawing Sheets

APPARATUS AND METHOD FOR TRANSMISSION AND RECEPTION IN A MULTI-USER MIMO COMMUNICATION SYSTEM

PRIORITY

This application claims priority under 35 U.S.C. §119 to an application filed in the Korean Intellectual Property Office on Feb. 21, 2006 and assigned Serial No. 2006-16805, and an application filed in the Korean Intellectual Property Office on Jan. 12, 2007 and assigned Serial No. 2007-3750, the contents of both of which are incorporated herein by reference.

BACKGROUND OF THE INVENTION

1. Field of the Invention

The present invention relates generally to a multi-user Multiple-Input Multiple-Output (MIMO) communication system, and in particular, to a transmitting and receiving apparatus and method for reducing the complexity of transmit filter computation, for use in a Frequency Division Duplex (FDD) system and a Time Division Duplex (TDD) system.

2. Description of the Related Art

A multi-user MIMO communication system offers the benefit of increased spectral efficiency for a transmitter using multiple antennas. If a receiver also uses multiple antennas, the spectral efficiency is further increased because multiple links are established between the transmitter and a single user. Further in the multi-user MIMO communication system, the same resources are accessible to a plurality of users, and independent data channels exist between the transmitter and a plurality of receivers. A multiplexing scheme called multi-user spatial multiplexing is used for multi-access.

For a higher spectral efficiency, complete channel information of the other communication party is required and non-linear processing should be performed for data transmission.

Accordingly, a Base Station (BS) should have knowledge of channel states of all Mobile Stations (MSs) for the downlink. However, it is generally difficult to acquire prior knowledge of the channel states in real implementation.

In a TDD system using a slow-varying fading channel, the BS can rely on channel reciprocity to acquire channel information of the MSs. Channel reciprocity means that downlink channel information can be derived from uplink channel information on the assumption that an uplink channel and a following downlink channel have the same channel characteristics in the TDD system using the same frequency band for transmission and reception.

However, if the assumption is not valid, the performance of a closed-loop multi-user MIMO scheme fails to approach the capacity of a MIMO broadcast channel.

Conventionally, the multi-user MIMO communication system is implemented by deriving downlink channel information of an MS based on channel reciprocity and sending a transmit filter to the MS through downlink sounding. Transmit filters are used to achieve spatial multiplexing of multiple users on the same time-frequency resources.

This conventional multi-user MIMO communication system is confined to the TDD system. It is not viable for an FDD system because channel reciprocity is not available. Since the transmit filter is computed using an iterative algorithm, computation complexity is increased. If a smaller number of computation iterations are performed to decrease the complexity, the accuracy of the transmit filter is decreased, thus leading to performance degradation.

Accordingly, there exists a need for an apparatus and method for overcoming the complexity problem encountered with filter computation, for use in the FDD system and the TDD system.

SUMMARY OF THE INVENTION

An object of the present invention is to substantially solve at least the above problems and/or disadvantages and to provide at least the advantages below. Accordingly, an object of the present invention is to provide a transmitting and receiving apparatus and method for a multi-user MIMO system, which can be used in both TDD and FDD systems.

Another object of the present invention is to provide an apparatus and method for efficiently providing channel information of an MS to a BS.

A further object of the present invention is to provide an apparatus and method for reducing the complexity of transmit filter computation in a BS.

According to an aspect of the present invention, there is provided a transmitter in a multi-user MIMO communication system, in which a filter portion receives quantized Channel State Information (CSI) and Channel Quality Information (CQI) from a receiver, calculates a transmit filter using the quantized CSI and the CQI, determines an appropriate Adaptive Modulation and Coding (AMC) level for the receiver, and sends a pilot signal including the transmit filter and information about the determined AMC level on subcarriers in one of a preamble and data symbols. An antenna is used to send the output of the filter portion and receives data from the receiver.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The present invention discloses an apparatus and method for transmission and reception in a multi-user MIMO communication system. Herein, a user and an MS are interchangeably used.

Figure 1:
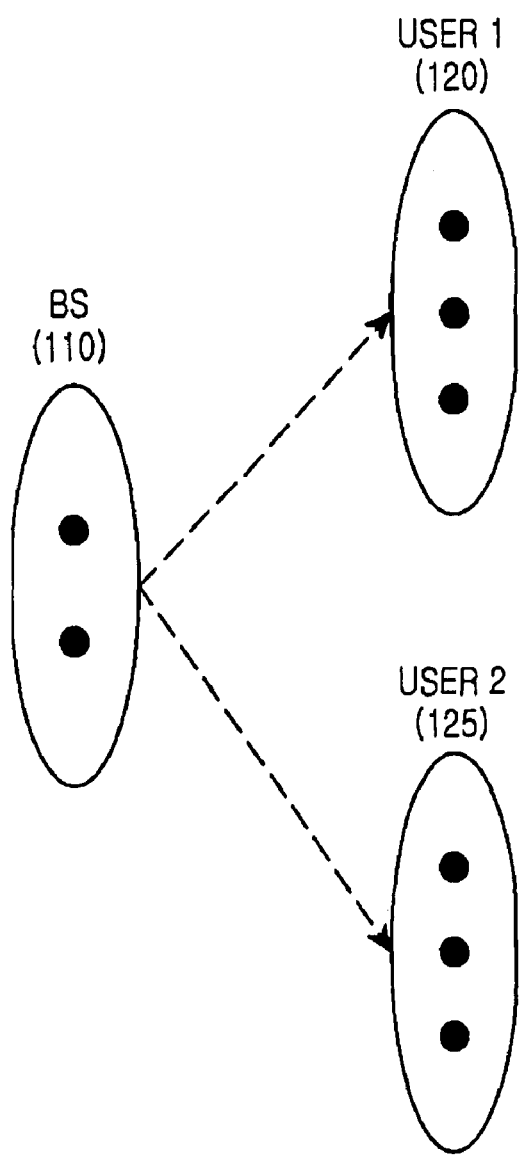
FIG. 1 illustrates a multi-user MIMO communication system in which a BS with two transmit antennas communicates with a plurality of MSs each having two or more antennas according to the present invention.

FIG. 1 illustrates a multi-user MIMO communication system in which a BS with two transmit antennas communicates with a plurality of MSs each having two or more antennas according to the present invention.

Referring to FIG. 1, a BS 110 has two transmit antennas and two MSs 120 and 125 each have two or more antennas. The BS 110 sends independent data streams to the MSs 120 and 125 simultaneously by spatial multiplexing.

Figure 2:
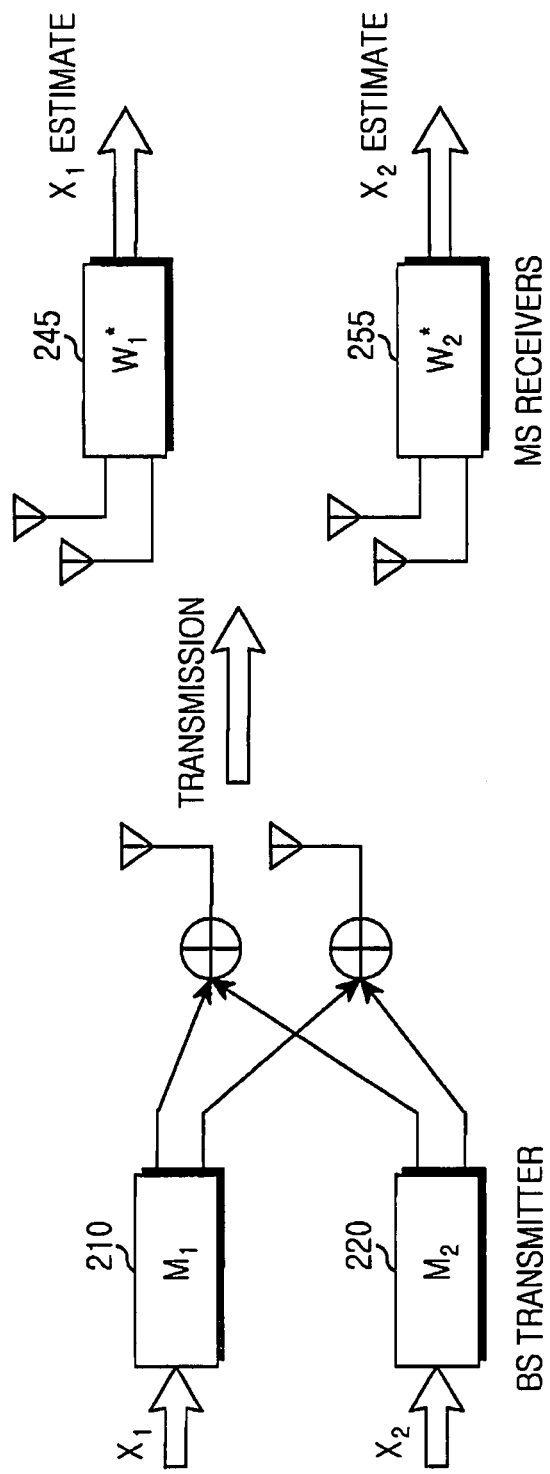
FIG. 2 illustrates a data transmission model for a BS and MSs with two antennas according to the present invention.

FIG. 2 illustrates a data transmission model for a BS with two antennas and MSs each having two antennas according to the present invention.

Referring to FIG. 2, the BS has transmit filters 210 and 220 by which to send data to the MSs each having two antennas. The MSs have receive filters 245 and 255 by which to receive data from the BS.

In the above data transmission model, each of the MSs may be placed in a different environment and may not be robust against the correlation with the other MS.

From the BS's perspective, therefore, the BS needs an appropriate transmit filter for each MS and the MS also correspondingly needs an appropriate receive filter.

The BS calculates the transmit filter value and conveys it to the MS. The MS calculates its appropriate receive filter value based on the transmit filter value.

Transmission of control information associated with the receive filter from the BS is called one-way channel sounding, also referred here to as downlink sounding in the present invention. The present invention is also applicable to more than two antennas at the MS.

The BS can compute the transmit filter value using several methods which will now be described.

Method 1: This method begins with estimating the statistic channel matrix of each MS, thus being robust against various fast-varying small-scale fading environments.

Referring back to FIG. 2, let the number of antennas in the BS be denoted by N and the number of antennas in each of the MSs be denoted by $N_k$. Then, N=2 and $N_k \geq 2$. K denotes the number of MSs within the coverage area of the BS. It is assumed that K=N. It will be understood by those skilled in the art that this method can be applied in a straightforward manner if K>N with the use of a scheduling algorithm to first select N users out of K users. The channel between the BS and a $k^{th}$ MS is represented by a matrix $H_k$ with $N_k \times N$ complex entries, including Additive White Gaussian Noise (AWGN).

The BS initializes the transmit filter for the MS by setting the transmit filter to the last used transmit filter or a random one. The BS monitors the channel environment of the MS and calculates a channel matrix or channel covariance matrix by statistic estimation for the MS. Let this matrix be denoted by $\overline{H}_k$.

For an average channel matrix, the above operation amounts to calculation of an expected value $E[H_k]$ of the average channel matrix, and calculation of $E[H_k]*E[H_k]$. For a channel covariance matrix, it amounts to calculation of an expected value of the channel covariance matrix $E[H_k*H_k]$.

The statistically estimated channel matrix or channel covariance matrix and the initialized transmit filter value are subject to the following iterative operation in Equation (1).

$$H_{\textit{eff}} = [(M_1 * \overline{H}_1)^T \ldots (M_k * \overline{H}_k)^T]^T$$

$$M = H_{\textit{eff}}^{-1} \quad (1)$$

Where $M_k$ is the $k^{th}$ column of matrix M, and the superscript * denotes the transpose conjugate matrix (or vector) operation.

The transmit filter value is then normalized by Equation (2), in which $$M_k = \frac{M_k}{\|M_k\|} \quad (2)$$

The normalization of the transmit filter is performed to meet the transmitter power constraint. The operation of the BS and the MS according to Method 1 will be described later with reference to FIGS. 6 and 7.

Method 2: The BS acquires a partial CSI and a partial CQI by finite-rate quantized feedback and computes the transmit filter value.

The BS uses both the CSI and CQI to achieve the Effective SNR (ESNR) or SNR of the MS, which are used to adapt the transmission rate to the channel capacity.

The MS efficiently feeds back the partial CSI and CQI with small overhead to the BS.

It is assumed that the temporal variations of the channel area slow, compared to the duration of downlink and uplink frames in the multi-user MIMO communication system according to the present invention. Thus, it can also be assumed that the channel is approximately constant in a plurality of consecutive frames.

After receiving pilot signals from the BS, the $k^{th}$ MS estimates the channel matrix $H_k$. Typically, a transmitter and a receiver each have a channel estimator, which is beyond the scope of the present invention. Hence, a detailed description of the channel estimation is not provided herein. The $k^{th}$ MS feeds back the channel information to the BS.

Upon receipt of channel information from all the MSs, the BS calculates a transmit filter $M_k$ for each of the MSs based on the channel information of the MS. $M_k$ denotes a transmit filter for the $k^{th}$ MS and $W_k$ denotes a receive filter for the $k^{th}$ MS.

The MS performs channel estimation using pilots of a preamble or pilots of data in a downlink frame.

The $k^{th}$ MS estimates the channel matrix $H_k$ with 2×2 entries. As expressed in Equation (3), it derives the following 2×2 channel from $H_k$ $$\overline{H} = \frac{H_k^* H_k}{\|H_k\|_{Fro}^2} = \begin{pmatrix} \overline{H}_{k,11} & \overline{H}_{k,12} \\ \overline{H}_{k,21} & \overline{H}_{k,22} \end{pmatrix} \quad (3)$$

Note that $\overline{H}_{k,21} = \overline{H}^*_{k,12}$. $\overline{H}_{k,11}$ and $\overline{H}_{k,22}$ are real positive numbers such that $\overline{H}_{k,11} + \overline{H}_{k,22} = 1$. $\overline{H}_{k,12} = \overline{H}_{k,12}^{real} + i\overline{H}_{k,12}^{imag}$ is complex and $\overline{H}_{k,12}{}^{real}$ and $\overline{H}_{k,12}{}^{imag}$ are real numbers with absolute values less than 1. $\overline{H}_{k,11}$, $\overline{H}_{k,12}{}^{real}$ and $\overline{H}_{k,12}{}^{imag}$ can be respectively quantized to $\overline{H}_{k,11q}$, $\overline{H}_{k,12q}{}^{real}$ and $\overline{H}_{k,12q}{}^{imag}$ using a predetermined number of bits. $\|H_k\|_{Fro}^2$ represents the squared Frobenius norm of the 2×2 complex matrix $H_k$. The MSs feed back their quantized information to the BS.

Alternatively, the above information is more effectively expressed in Equation (4) as $$\overline{H}_{k,11}=\cos^2 \theta_k \text{ and } \overline{H}_{k,22}=\sin^2 \theta_k, \text{ with } 0\leq\theta_k<90°$$

$$\overline{H}_{k,12}=(\cos^2 \Phi_k)e^{j\phi_k}, \text{ with } 0\leq\Phi_k<90° \text{ and } 0\leq\phi_k<360° \quad (4)$$

Thus, the MS quantizes the three angles. The MS detects indexes corresponding to the quantized three angles in a codebook. For example, B bits per index can be used to represent $\theta_k$ and $\Phi_k$, and B' bits to represent $\phi_k$. This feedback is quantized CSI.

It is to be noted that two different, code books, one with values slightly shifted with respect to the other, can be used at the BS to represent two users, to thereby avoid numerical instability by eliminating special cases. All the MSs use the same codebook, known by all MSs and by the BS. The shift operation can be applied at the BS, but the MSs do not need to know about it. Here, the shifting value is smaller than the resolution of the codebook.

Each MS also computes the CQI by $\|H_k\|_{Fro}^2/\sigma_k^2$, where $\sigma_k^2$ is the variance of the additive white Gaussian noise at the receiver of the $k^{th}$ MS. This CQI is also quantized and fed back to the BS. Alternatively, it can be fed back to the BS using a different representation.

The CQI alone does not allow the BS to predict the SNR. The BS requires both the CSI and the CQI to predict the SNR experienced by the MS during downlink data transmission.

The following derivations show how the BS can estimate the SNR of each MS from the CSI and the CQI defined above.

During data transmission, in Equation (5) user 1 receives $$y=H_1M_1b_1+H_1M_2b_2+w_1 \quad (5)$$

where $M_k$ is a transmission beamforming vector applied to data $b_k$ of the $k^{th}$ MS and $W_k$ is AWGN at the receiver.

The MS processes the received signal with a Zero-Forcing (ZF) or Minimum Mean Squared Error (MMSE) filter. Assuming an ideal ZF filter, a symbol transmitted to user 1 is estimated in Equation (6) by $$\hat{b}_1 = \frac{M_1^*H_1^*}{\|M_1^*H_1^*\|}y_1 \quad (6)$$

$$= \frac{M_1^*H_1^*H_1M_1}{\|M_1^*H_1^*\|}b_1 + \frac{M_1^*H_1^*M_1H_2}{\|M_1^*H_1^*\|}b_2 + \frac{M_1^*H_1^*}{\|M_1^*H_1^*\|}w_1$$

Ideally, $M_1^*H_1^*H_1M_2=0$. Hence, in Equation (7) an estimate of the transmitted data is $$\hat{b}_1 = \frac{M_1^*H_1^*H_1M_1}{\|M_1^*H_1^*\|}b_1 + \frac{M_1^*H_1^*}{\|M_1^*H_1^*\|}w_1 \quad (7)$$

The SNR for user 1 is given in Equation (8) as $$SNR_1 = |M_1^*H_1^*H_1M_1|\frac{E[|b_1|^2]}{E[|w_1|^2]} = |M_1^*\overline{H}_1M_1|\frac{E[|b_1|^2]}{E[|w_1|^2]}\|H_1\|_{Fro}^2 \quad (8)$$

$$SNR_1 = |M_1^*\overline{H}_1M_1|\frac{P_{t,1}}{\sigma_1^2}\|H_1\|_{Fro}^2$$

where $P_{t,1}$ is transmit power allocated to user 1.

Therefore, the BS only needs to know $\sigma_1^2$, $\|H_1\|_{Fro}^2$, or their ratio, in addition to the available knowledge of the quantized CSI and the computed filters, in order to estimate the SNR achievable by user 1.

Using channel information, the BS computes the transmit filers in such a manner that the complexity problem encountered with the conventional transmit filter computation is overcome.

The BS recovers the channel information using the quantized feedback received from each MS.

The BS first calculates $\overline{H}_{k,11q}$, $\overline{H}_{k,22q}$, $\overline{H}_{k,12q}{}^{real}$ and $\overline{H}_{k,12q}{}^{imag}$ for the MSs (k is the number of the MSs, k=1, 2). The BS can recover the channel information from a direct feedback or using quantized angles.

Then the BS computes the transmit filter in Equation (9) by $$\overline{H}_{1,12,q} = \overline{H}_{1,12,q}^{real} + i\overline{H}_{1,12,q}^{imag} \text{ and } \overline{H}_{2,12,q} = \overline{H}_{2,12,q}^{real} + i\overline{H}_{2,12,q}^{imag} \quad (9)$$

$$A_1 = \begin{pmatrix} \overline{H}_{1,22,q} & -\overline{H}_{1,12,q} \\ -\overline{H}_{1,12,q}^* & \overline{H}_{1,11,q} \end{pmatrix} \text{ and } A_2 = \begin{pmatrix} \overline{H}_{2,11,q} & \overline{H}_{2,12,q} \\ \overline{H}_{2,12,q}^* & \overline{H}_{2,22,q} \end{pmatrix}$$

$$G = A_1 A_2 = \begin{pmatrix} g_{11} & g_{12} \\ g_{21} & g_{22} \end{pmatrix}$$

$$a = (g_{11} - g_{22})/2$$

$$b = \sqrt{(a^2 + g_{21}g_{12})}$$

$$V_1 = \begin{pmatrix} a-b \\ g_{21} \end{pmatrix} \text{ and } V_2 = \begin{pmatrix} a+b \\ g_{21} \end{pmatrix}$$

$$M_1 = \frac{V_1}{\sqrt{((a-b)^2 + g_{21}^2)}} \text{ and } M_2 = \frac{V_2}{\sqrt{((a+b)^2 + g_{21}^2)}}$$

where $M_1$ and $M_2$ are transmit filters for user 1 and user 2, respectively. The transmit filter computation is performed without using an iterative algorithm and thus has low complexity.

If the quantized feedback is without errors, the transmit filters have the following property in Equation (10):

$$M_k^*H_k^*H_kM_n = \begin{cases} 0, & k \neq n \\ > 0, & k = n \end{cases} \quad (10)$$

The BS knows an optimal transmit filter for each of the MSs, but the MSs do not know these transmit filters. Since the MSs only have their own channel information, they cannot independently calculate the transmit filters.

Thus, by downlink sounding, the BS sends the transmit filters to the MSs by pilot tones along with data symbols or along with a preamble before the data symbols.

Upon receipt of the transmit filter value, each of the MSs calculates a receive filter value. An optimal ZF receive filter ⊦expressed in the following relationship in Equation (11):

$$W_k \sim \alpha_k H_k M_k \quad (11)$$

where $\alpha_k$ is a normalization parameter.

For simplicity purposes, it is assumed that a pilot tone for the $k^{th}$ MS is sent on a $k^{th}$ subcarrier. It is further assumed that the channel matrix is constant over several subcarriers, which holds true as long as the frequency band covered by the subcarriers is smaller than the coherence bandwidth of the channel.

The pilot tone sent by the BS can be seen as beamforming a known signal to the $k^{th}$ MS. This known signal is assumed to be a 1 (or any known symbol) transmitted with power $P_t$. The transmission beamforming vector is the transmit filter $M_k$ for the $k^{th}$ MS.

The pilot signal sent to the $k^{th}$ MS on the $k^{th}$ pilot subcarrier is expressed in Equation (12) as:

$$x_k = M_k \times 1 \times \sqrt{P_t} = \sqrt{P_t} M_k \quad (12)$$

The signal received by the $k^{th}$ MS on a $j^{th}$ pilot subcarrier is expressed in Equation (13) as:

$$y_{k,j} = \sqrt{P_t} H_{k,j} M_j + w_{k,j} \quad (13)$$

where j is the index of the subcarrier for another user (i.e. a $(k+1)^{th}$ MS) and $w_{k,j}$ is a vector of AWGN with size $N_k \times 1$.

The effective channel vector between the BS and the $k^{th}$ MS on subcarrier i from transmit filter j is defined as $H_{k,i}M_j$. It can be estimated on pilot subcarriers, and then interpolated on data subcarriers, before detection of the data.

Now a description will be made of an operation of one of the MSs. This description holds true to the other MSs.

Using all pilots sent to all MS over a set of pilot subcarriers and time slots, user 1 estimates the effective channel vector $H_{1,i}M_1$ on each pilot subcarrier and then obtains an estimate of each effective channel vector $H_{1,i}M_1$ on all subcarriers by an interpolation technique. Also, using all pilots sent to user 2 over a different set of pilot subcarriers and time slots, user 1 estimates effective channel vector $H_{1,i}M_2$ on each pilot subcarrier, and then obtains an estimate of each effective channel vector $H_{1,i}M_2$ on all subcarriers by an interpolation technique. If we define $\hat{W}_{1,i}=H_{1,i}M_1$ and $\hat{W}_{2,i}=H_{1,i}M_2$ for user 1, as a result, on an $i^{th}$ subcarrier, user 1 determines $N_i \times 1$ vectors $\hat{W}_{1,i}$ and $\hat{W}_{2,i}$. Then user 1 computes the MMSE receive filter that it will actually use on each subcarrier for data detection.

For the $i^{th}$ subcarrier, in Equation (14) user 1 computes $$\hat{W}_i = [\hat{W}_{1,i}, \hat{W}_{2,i}]$$

$$F_{1,i} = (\hat{W}_i \hat{W}_i^* + \rho_1 I_{N_i})^{-1} \hat{W}_{1,i} \quad (14)$$

where $\rho_1$ is the SNR of user 1 and $I_2$ is a $N_i \times N_i$ identity matrix. Then $F_{1,i}$ is normalized.

Now both the BS and the MSs know the transmit filters and the receiver filters. When data transmission starts, the BS sends a vector of modulation symbols s where a symbol $s_k$ is sent to the $k^{th}$ MS.

The vector is multiplied by the transmit filters and then sent on the channel, with total transmit power $P_o$. It is assumed that the total transmit power is uniformly allocated to the MSs, and that the average energy of symbols $s_n$ is equal to 1. For convenience, the subcarrier index is omitted in equation (15). In Equation (15), the transmitted vector is $$x = \sqrt{\frac{P_o}{2}} \sum_{n=1}^{N} M_n s_n \quad (15)$$

In Equation (16), the signal received at the $k^{th}$ MS is $$y_k = \sqrt{\frac{P_o}{2}} H_k \sum_{n=1}^{N} M_n s_n + w_k \quad (16)$$

In Equation (17), the $k^{th}$ MS applies its receive filter to obtain $$\hat{s}_k = F_k^* y_k \quad (17)$$

$$\hat{s}_k = F_k^* \left( \sqrt{\frac{P_o}{2}} H_k \sum_{n=1}^{N} M_n s_n + w_k \right)$$

$$\hat{s}_k = \sqrt{\frac{P_o}{2}} \sum_{n=1}^{N} F_k^* H_k M_n s_n + F_k^* w_k$$

Some further normalization is needed to obtain an unbiased estimate of $s_k$.

The manner in which the BS and the MS operate in Method 2 will be described with reference to FIGS. 3 and 8.

Figure 3:
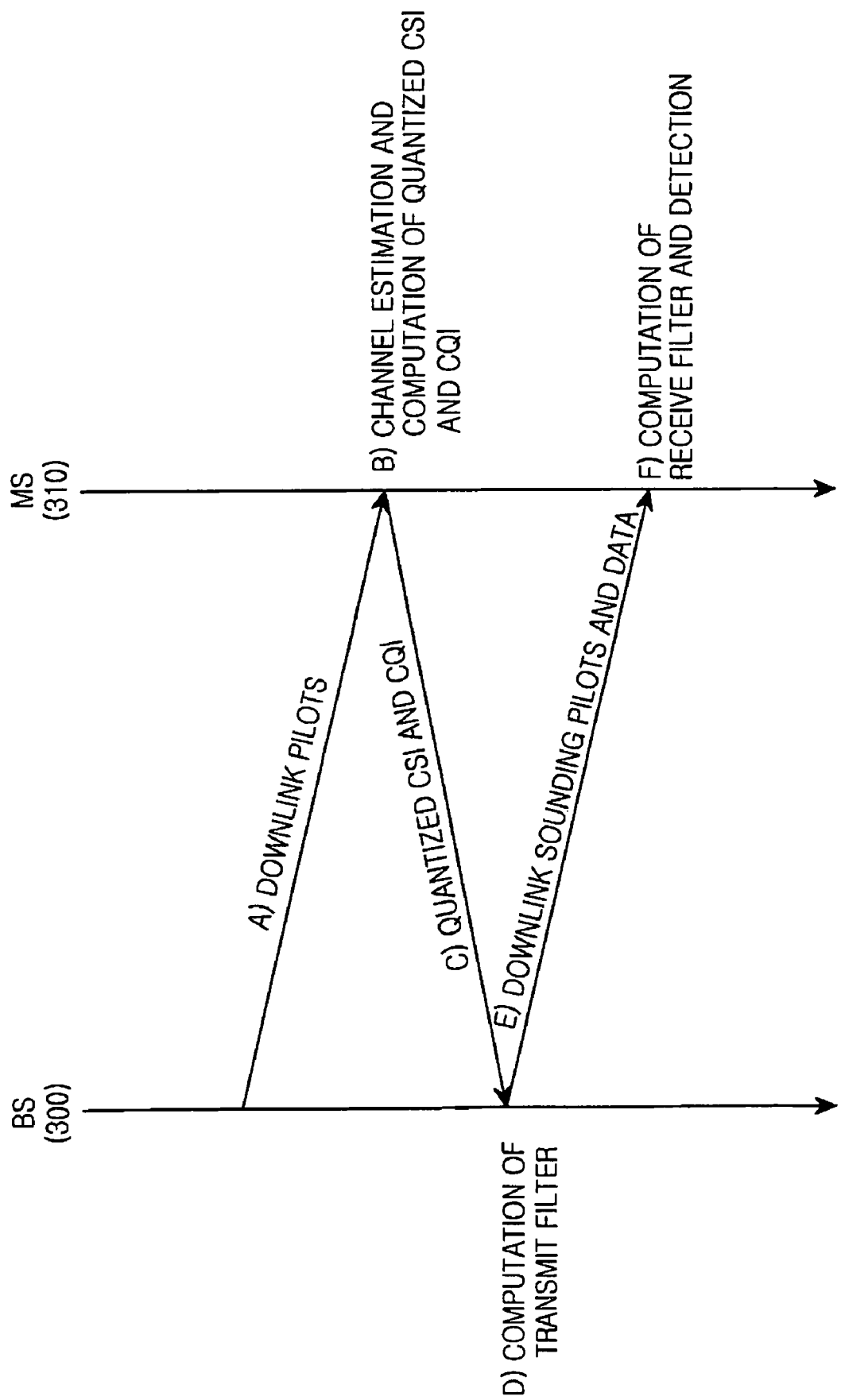
FIG. 3 illustrates a signal flow for communications between the BS and an MS in the multi-user MIMO communication system according to the present invention.

FIG. 3 illustrates a signal flow for communications between the BS and the MS in the multi-user MIMO communication system according to the present invention.

Referring to FIG. 3, an MS 310 performs a channel estimation using pilots in a preamble or in pilot subcarriers of a downlink frame received from a BS 300 in step A).

In step B), the MS 310 calculates CQI and quantized CSI ($\theta_k$, $\phi_k$ and $\phi_k$) using the estimated channel information. The MS 310 sends the CQI and quantized CSI to the BS 300 in step C).

The BS 300 calculates a transmit filter value using the received information in step D) and sends an optimal transmit filter to the MS 310 by downlink sounding in step E).

In step F), the MS 310 performs a channel estimation using downlink sounding pilots and calculates a receive filter value based on the channel estimation.

The above operation is repeated for the next downlink data transmission.

Figure 4:
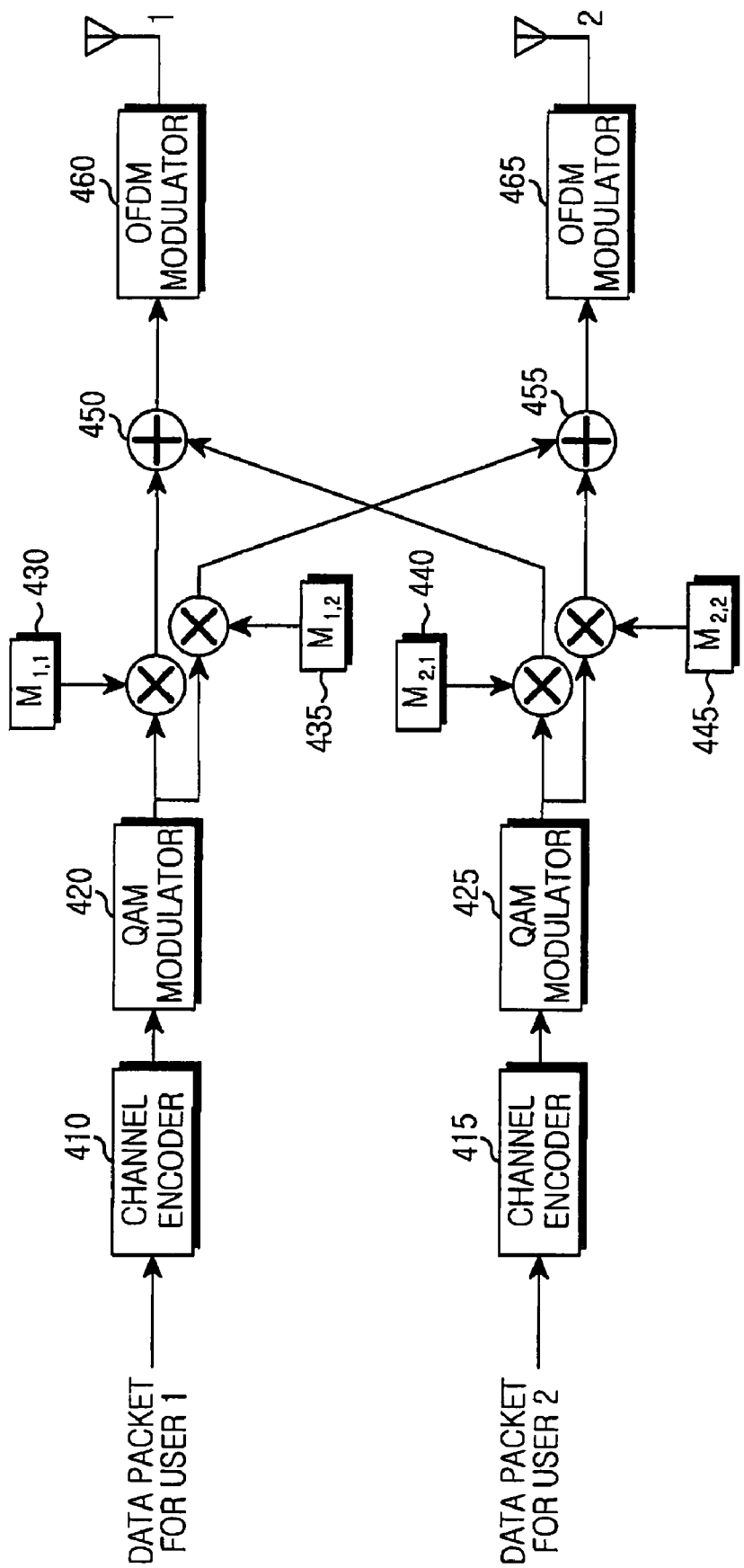
FIG. 4 illustrates a transmitter according to the present invention.

FIG. 4 illustrates a transmitter according to the present invention.

Referring to FIG. 4, channel encoders 410 and 415 encode data packets destined for MSs and modulators 420 and 425 modulate the coded data. The modulation symbols from the modulation 420 are multiplied by transmit filters 430 and 435, and the modulation symbols from the modulation 425 are multiplied by transmit filter values 440 and 445. An adder 450 sums the product between the modulation symbols from the modulator 420 and the transmit filter value 430 and the product between the modulation symbols from the modulator 425 and the transmit filter value 440. An adder 455 sums the product between the modulation symbols from the modulator 420 and the transmit filter 435 and the product between the modulation symbols from the modulator 425 and the transmit filter value 455. This chain is present on each subcarrier Orthogonal Frequency Division Multiplexing (OFDM) modulators 460 and 465 OFDM-modulate the sums received from the adders 450 and 455 of all subcarriers.

Figure 5:
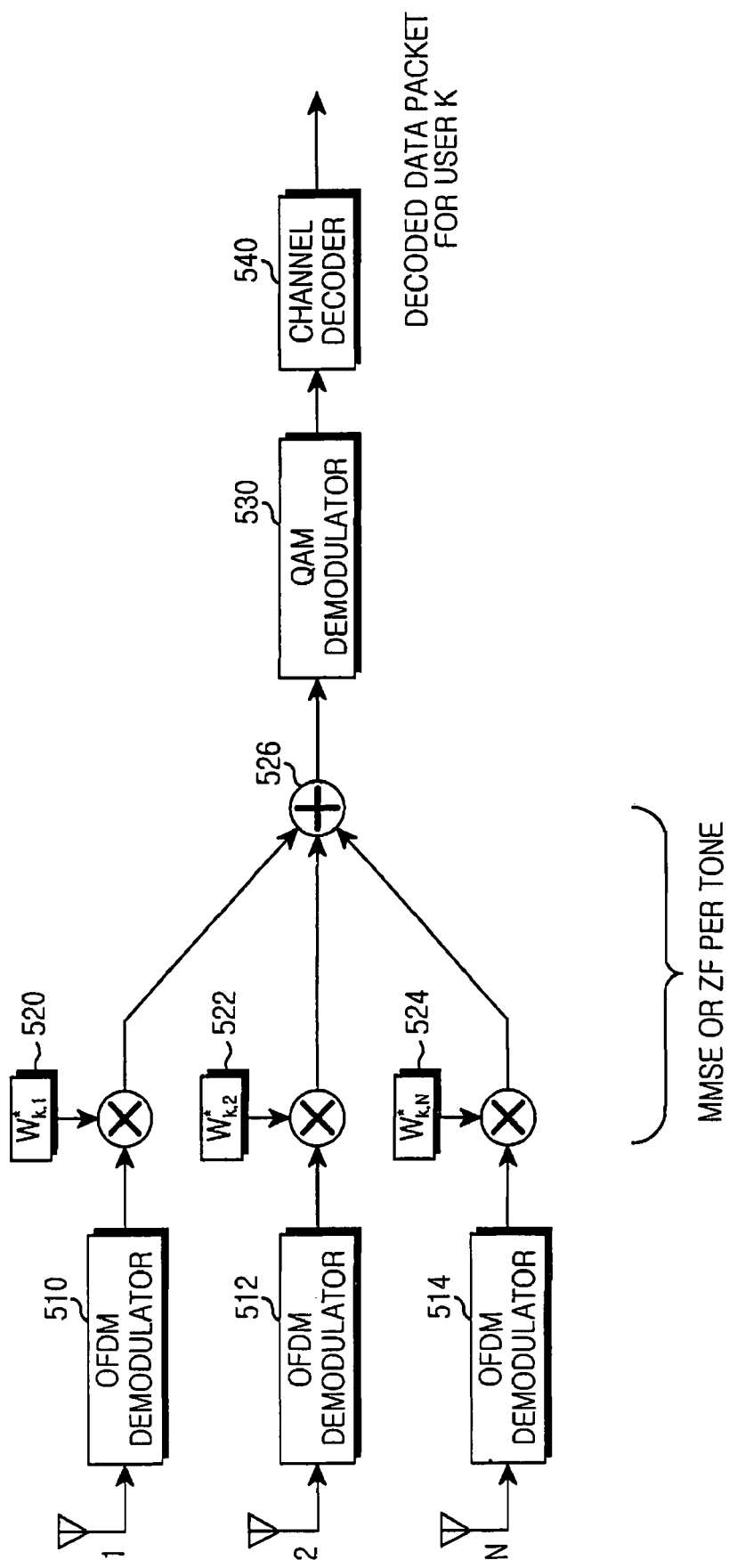
FIG. 5 illustrates a receiver according to the present invention.

FIG. 5 illustrates a receiver according to the present invention.

Referring to FIG. 5, OFDM demodulators 510, 512 and 514 OFDM-demodulate signals received through a plurality of antennas. The OFDM-demodulated signals are multiplied by filters coefficients 520, 522 and 524 for respective MSs and summed in an adder 526. The sum is demodulated according to a digital demodulation method in a demodulator 530 and channel-decoded in a channel decoder 540.

Figure 6:
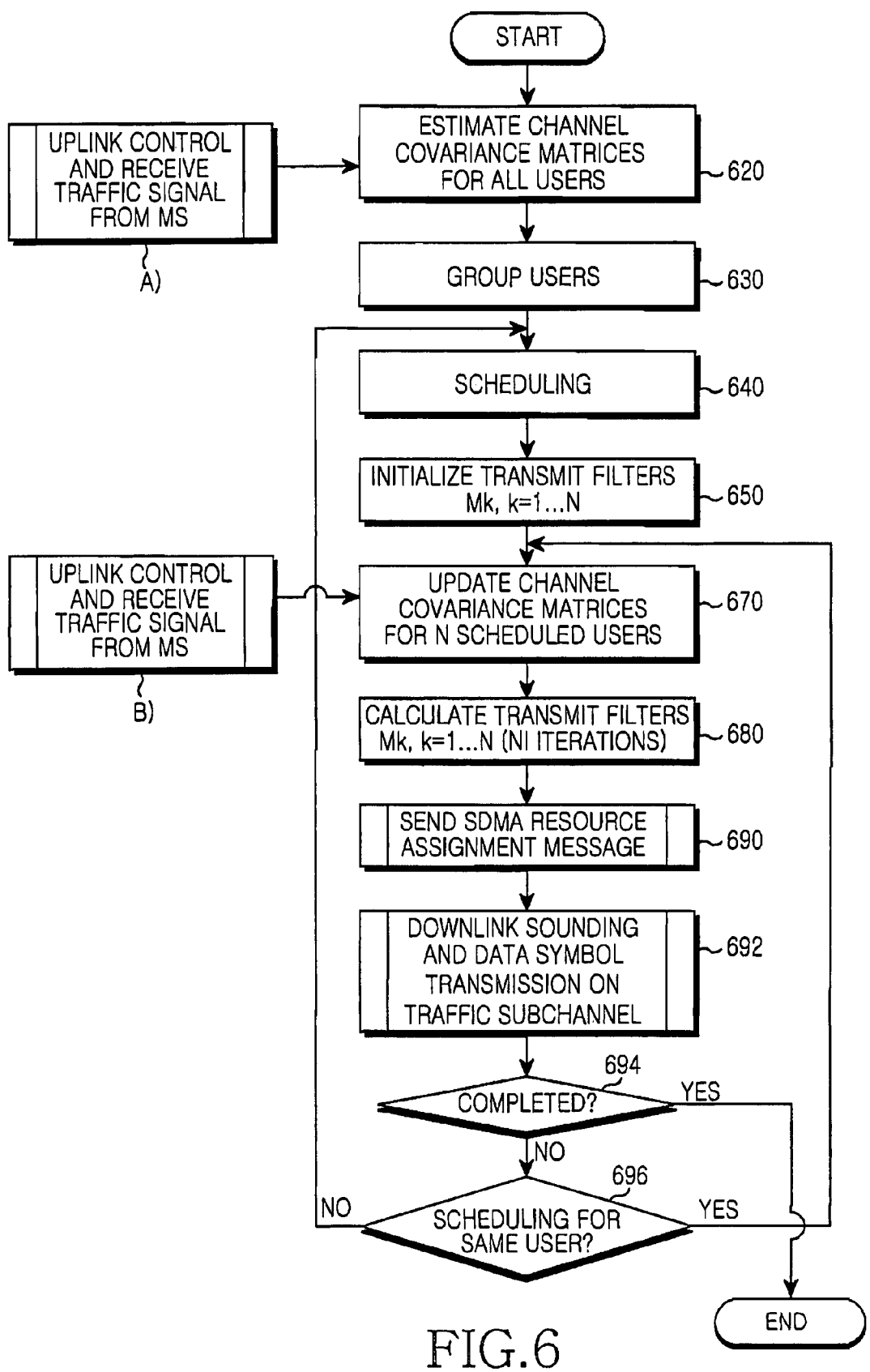
FIG. 6 illustrates a normalization-based operation of the BS according to the present invention.

FIG. 6 illustrates a normalization-based operation of the BS according to the present invention.

Referring to FIG. 6, the BS performs an uplink control operation and receives traffic signals from MSs in steps A) and B).

The BS estimates downlink channel matrices or channel covariance matrices for all the MSs in step 620, groups the MSs in step 630, and schedules MSs in step 640.

The BS initializes transmit filters in step 650. For the scheduled MSs, the BS updates the channel matrices or channel covariance matrices according to the signals received from the MSs in step 670 and calculates the transmit filter values for them in step 680. The calculation is repeated for every user.

In step 690, the BS sends spatial multiplexing resource assignment messages to the MSs. Then the BS performs downlink sounding and sends data symbols on a traffic subchannel in step 692.

If the above operation is not completed for a particular user in step 696, it is repeated. Then the BS ends the algorithm.

Figure 7:
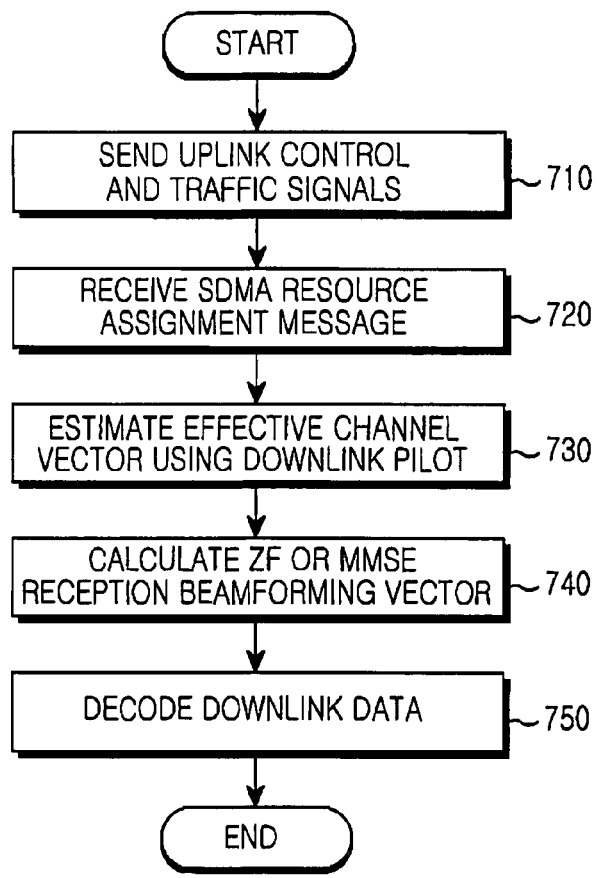
FIG. 7 illustrates a normalization-based operation of the MS according to the present invention.

FIG. 7 illustrates a normalization-based operation of the MS according to the present invention.

Referring to FIG. 7, the MS sends uplink control and traffic signals to the BS in step 710 and receives a spatial multiplexing resource assignment message from the BS in step 720. The spatial multiplexing resource assignment message may include a transmit filter used for the MS in the BS.

The MS estimates an effective channel vector using downlink pilots according to the spatial multiplexing resource assignment message in step 730 and calculates a beamforming vector using a ZF or MMSE filter in step 740 and decode downlink data in step 750. Then the MS ends the algorithm.

Figure 8:
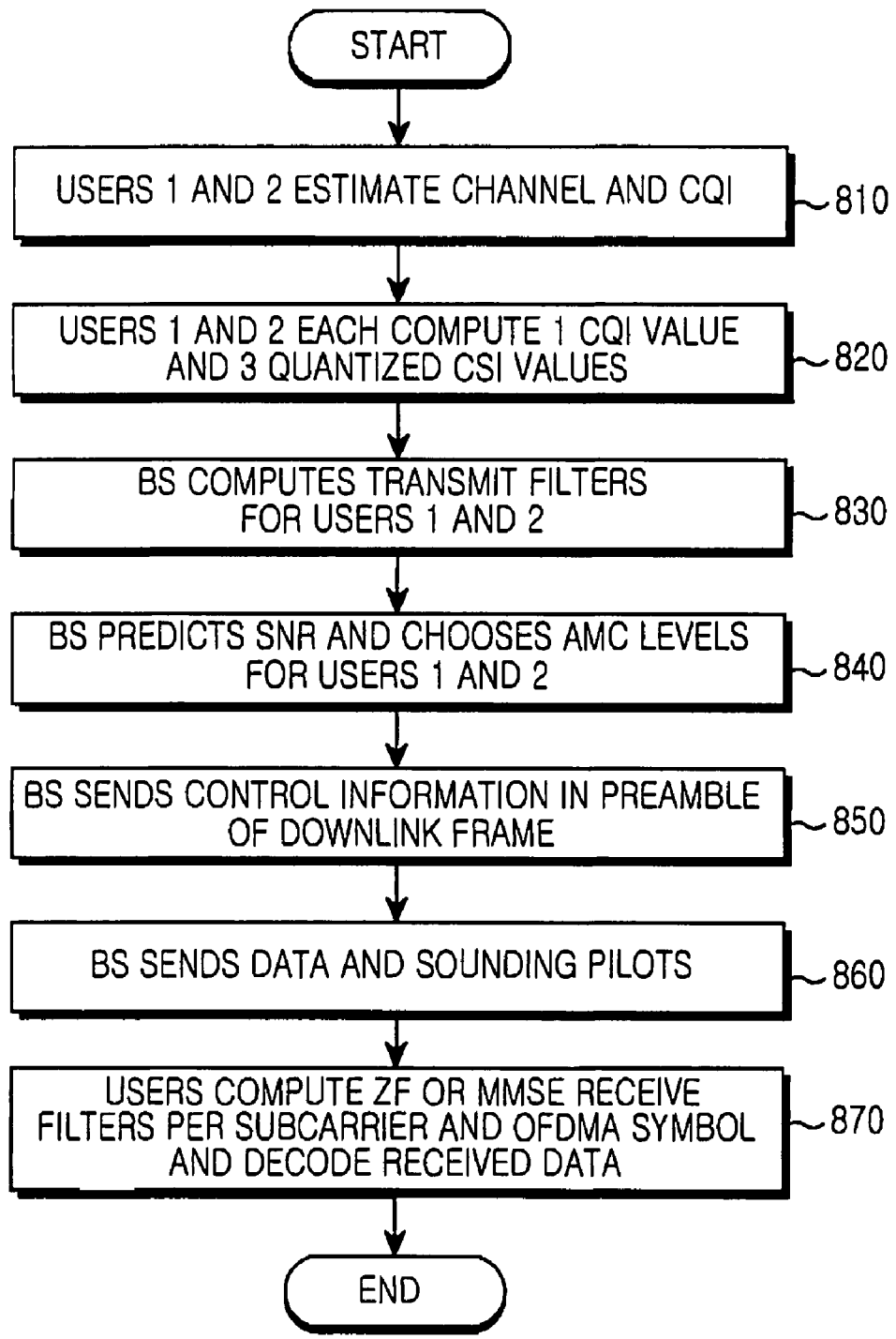
FIG. 8 illustrates a communication operation between the BS and MSs in the multi-user MIMO communication system according to the present invention.

FIG. 8 illustrates a communication operation between the BS and MSs in the multi-user MIMO communication system according to the present invention.

Referring to FIG. 8, user 1 and user 2 estimate channels and CQIs using pilots in a preamble of a downlink frame received from the BS in step 810. In step 820, user 1 and user 2 each calculate one CQI value and three quantized CSI values $\theta_k$, $\Phi_k$ and $\phi_k$ and send them to the BS.

In step 820, the BS calculates transmit filters for user 1 and user 2. The BS calculates SNRs and determines appropriate AMC levels for user 1 and user 2 in step 840.

The BS sends MAP information in a preamble of a downlink frame to user 1 and user 2 in step 850 and sends data and sounding pilots on the downlink to user 1 and user 2 in step 860.

In step 870, user 1 and user 2 calculate receive filter values and decode the received data. Then the algorithm ends.

Figure 9:
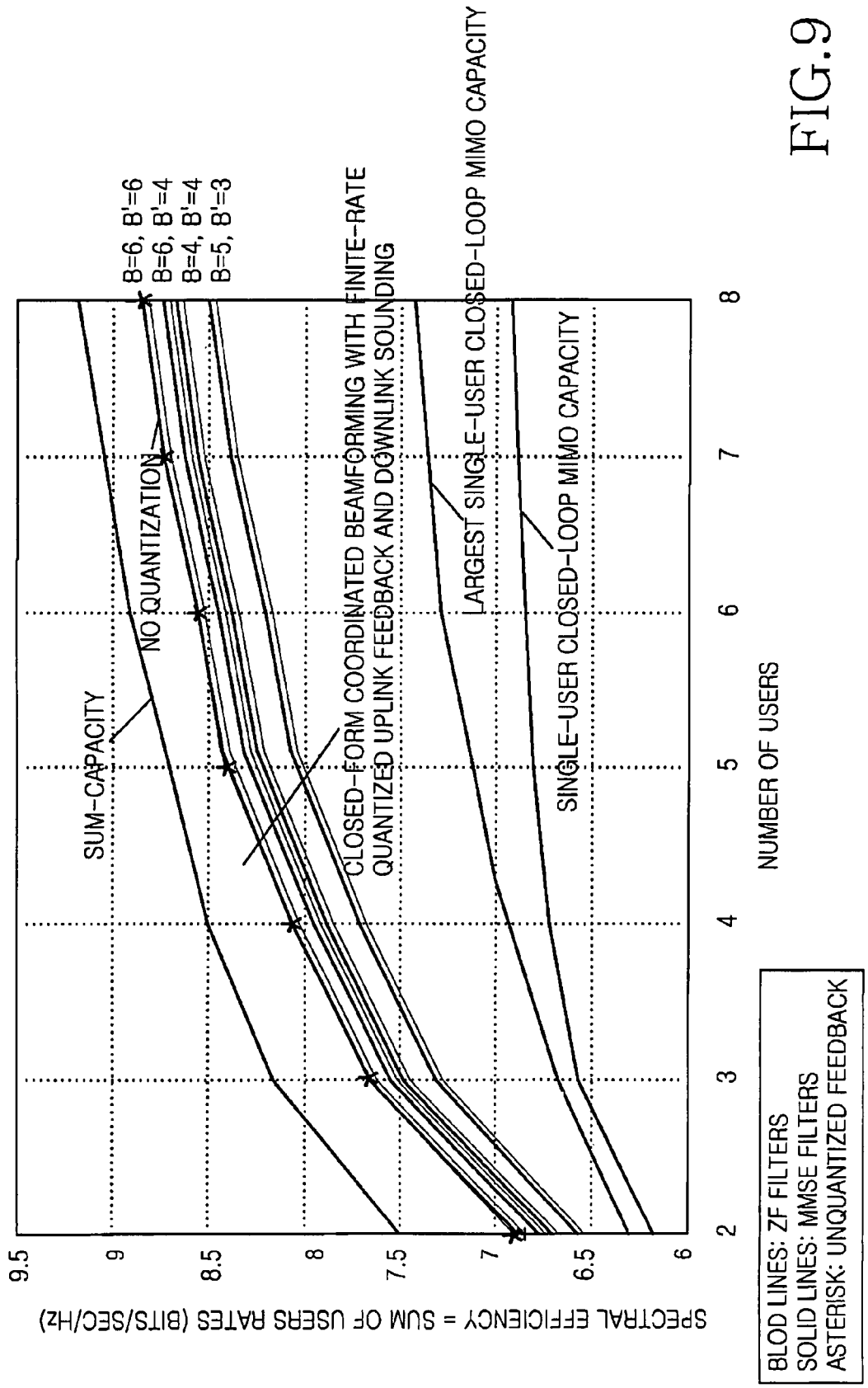
FIG. 9 illustrates spectral efficiency with respect to number of users in the multi-user MIMO communication system according to the present invention.

FIG. 9 illustrates spectral efficiency with respect to number of users in the multi-user MIMO communication system according to the present invention. Two transmit antennas and two receive antennas are provided per user.

Referring to FIG. 9, it is noted that as the number of users grows or the feedback amount of the users increases, spectral efficiency increases.

Figure 10:
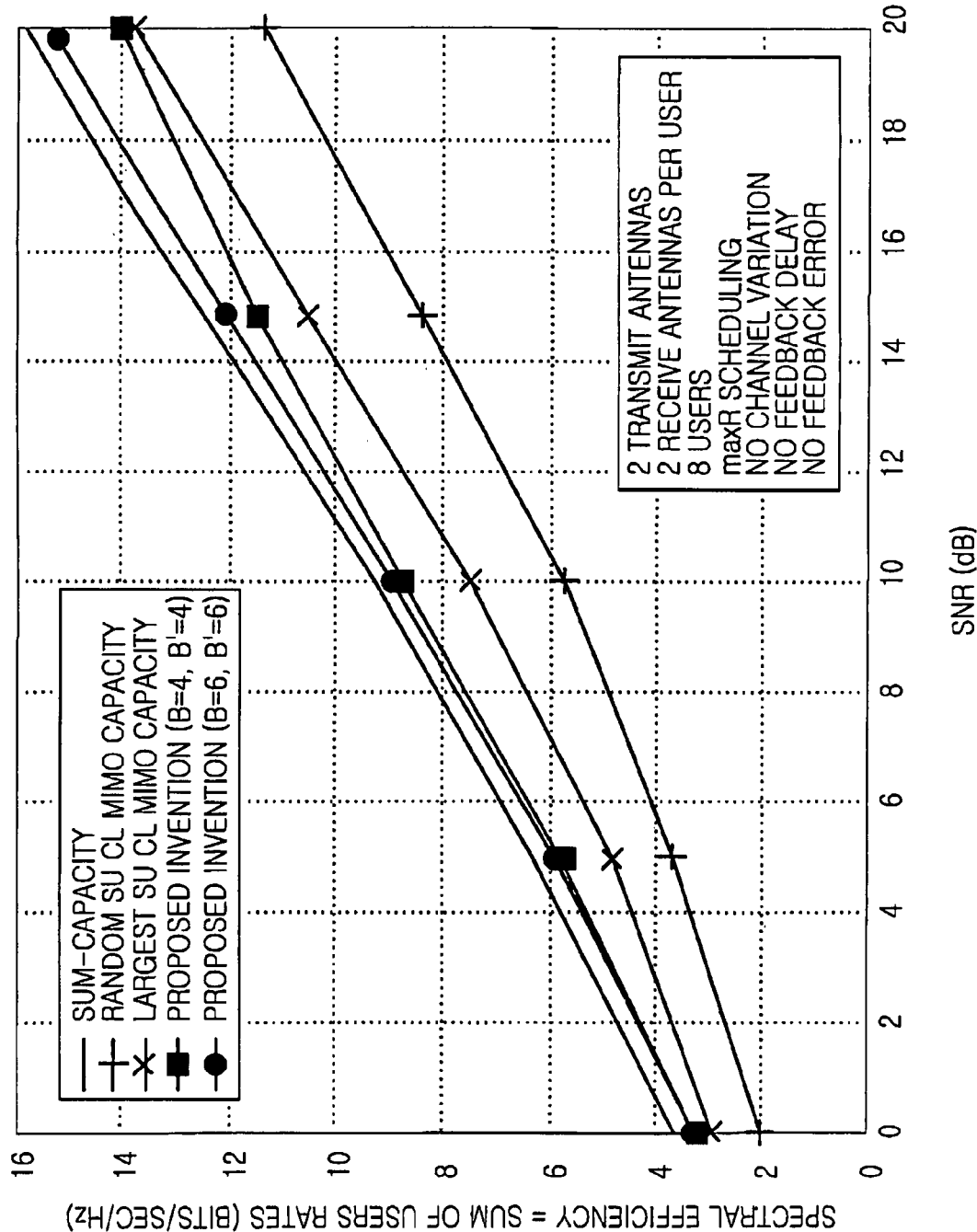
FIG. 10 illustrates spectral efficiency with respect to Signal-to-Noise Ratio (SNR) for a BS with two transmit antennas and eight MSs each having two receive antennas in the multi-user MIMO communication system according to the present invention.

FIG. 10 illustrates spectral efficiency as a function of SNR for eight MSs each having two transmit antennas and two receive antennas in the multi-user MIMO communication system according to the present invention.

Referring to FIG. 10, if two users are selected from the eight users and spatially multiplexed on the assumption that there is no channel change, no feedback delay and no feedback errors, a feedback rate of B=6 and B'=6 brings a higher spectral efficiency and gets closer to the sum-=capacity than a feedback rate of B=4 and B'=4.

Figure 11:
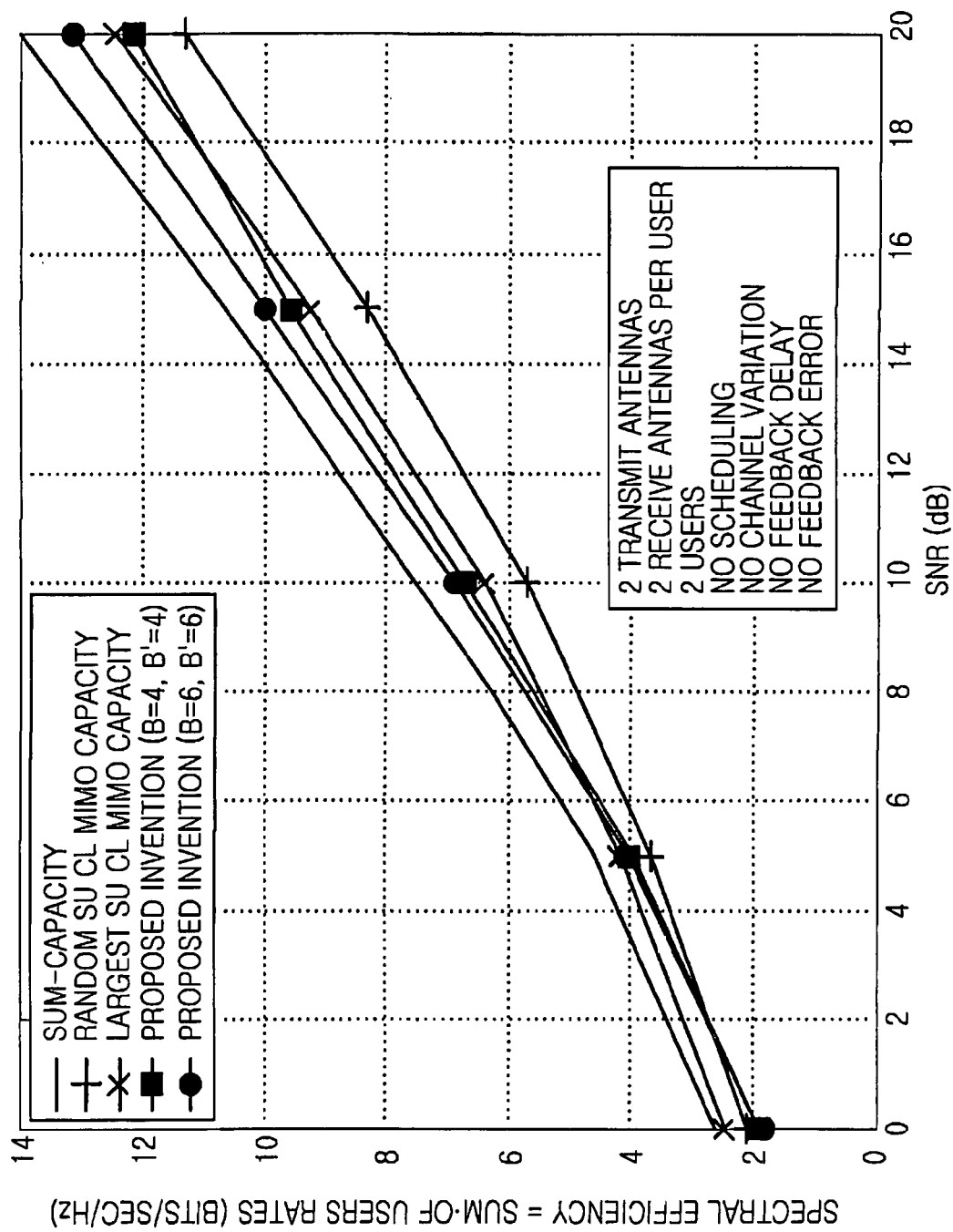
FIG. 11 illustrates spectral efficiency with respect to SNR for a BS with two transmit antennas and two MSs each having two receive antennas in the multi-user MIMO communication system according to the present invention.

FIG. 11 illustrates spectral efficiency as a function of SNR for two MSs each having two transmit antennas and two receive antennas in the multi-user MIMO communication system according to the present invention.

Referring to FIG. 11, as with FIG. 10, a higher spectral efficiency is achieved in a feedback rate of B=6 and B'=6 than in a feedback rate of B=4 and B'=4.

Figure 12:
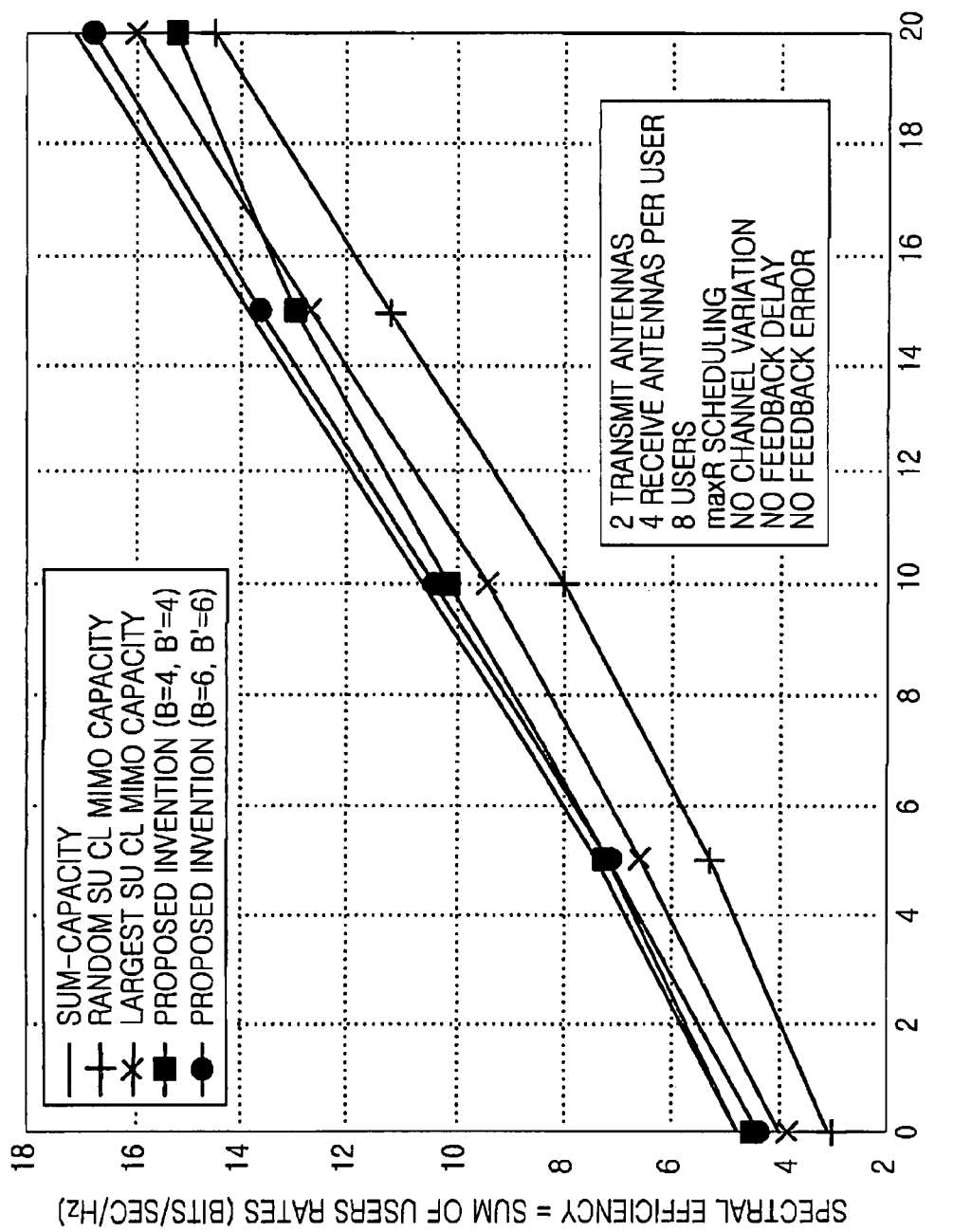
FIG. 12 illustrates spectral efficiency with respect to SNR for a BS with two transmit antennas and eight MSs each having four receive antennas in the multi-user MIMO communication system according to the present invention.

FIG. 12 illustrates spectral efficiency as a function of SNR for eight MSs each having two transmit antennas and four receive antennas in the multi-user MIMO communication system according to the present invention.

Referring to FIG. 12, as with FIGS. 10 and 11, a higher spectral efficiency is achieved in a feedback rate of B=6 and B'=6 than in a feedback rate of B=4 and B'=4. The graph also reveals that the feedback amount is independent of the number of receive antennas.

As is apparent from the above description, the present invention advantageously decreases feedback overhead and the complexity of transmit filter computation by finite-rate quantized feedback without relying on channel reciprocity in a multi-user MIMO system. Since the channel reciprocity is not used, the present invention is applicable to both TDD and FDD systems.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter in a multi-user Multiple-Input Multiple-Output (MIMO) communication system, the transmitter comprising:

a filter portion for receiving quantized Channel State Information (CSI) and Channel Quality Information (CQI) from a receiver, calculating a transmit filter value using the quantized CSI and the CQI, determining an appropriate Adaptive Modulation and Coding (AMC) level for the receiver, and sending a pilot signal including the transmit filter value and information about the determined AMC level on subcarriers in one of a preamble and data symbols; and two antennas for sending an output of the filter portion to a receiver and receiving data from the receiver;

wherein the filter portion calculates the pilot signal including the transmit filter value by $$x_k = M_k \times 1 \times \sqrt{P_t} = \sqrt{P_t} M_k$$

where k is used to identify the receiver and a subcarrier, $x_k$ is the pilot signal, $M_k$ is the transmit filter value, 1 is a known symbol to the transmitter and the receiver, and $P_t$ is transmit power for sending the symbol 1.

2. The transmitter of claim 1, wherein the quantized CSI and the CQI are information quantized according to a codebook of the receiver, the codebook being identical for each receiver.

3. The transmitter of claim 1, wherein when data is sent, the filter portion multiplies a vector of modulation symbols by the transmit filter value, and the filter portion estimates a Signal-to-Noise Ratio (SNR) for the receiver when determining the appropriate AMC level.

4. The transmitter of claim 3, wherein the filter portion estimates the SNR by $$SNR_1 = |M_1^* H_1^* H_1 M_1| \frac{E[|b_1|^2]}{E[|w_1|^2]} = |M_1^* \overline{H}_1 M_1| \frac{E[|b_1|^2]}{E[|w_1|^2]} \|H_1\|_{Fro}^2$$

$$SNR_1 = |M_1^* \overline{H}_1 M_1| \frac{P_{t,1}}{\sigma_1^2} \|H_1\|_{Fro}^2$$

where $P_{t,1}$ is transmit power allocated to a first user, $M_1$ is a transmit filter for the first user, $w_1$ is Additive White Gaussian Noise (AWGN) at the first user, $b_1$ is data for the first user, superscript * denotes a transpose conjugate matrix (or vector) operation, $E\|\cdot\|$ denotes an expected value, $\|H_1\|_{Fro}^2$ represents a squared Frobenius norm of a 2×2 complex matrix $H_1$, $\sigma_1^2$ is a variance of the AWGN at the receiver of the first user, $H_1$ is channel estimation by the first user, and $\overline{H}_1$ is statistic estimation for the channel of the first user by the base station.

5. The transmitter of claim 1, wherein the filter portion calculates the transmit filter value by $$\overline{H}_{1,12,q} = \overline{H}_{1,12,q}^{real} + i\overline{H}_{1,12,q}^{imag} \text{ and } \overline{H}_{2,12,q}$$
$$= \overline{H}_{2,12,q}^{real} + i\overline{H}_{2,12,q}^{imag}$$

$$A_1 = \begin{pmatrix} \overline{H}_{1,22,q} & -\overline{H}_{1,12,q} \\ -\overline{H}_{1,12,q}^* & \overline{H}_{1,11,q} \end{pmatrix} \text{ and } A_2 = \begin{pmatrix} \overline{H}_{2,11,q} & \overline{H}_{2,12,q} \\ \overline{H}_{2,12,q}^* & \overline{H}_{2,22,q} \end{pmatrix}$$

$$G = A_1 A_2 = \begin{pmatrix} g_{11} & g_{12} \\ g_{21} & g_{22} \end{pmatrix}$$

$$a = (g_{11} - g_{22})/2$$

$$b = \sqrt{(a^2 + g_{21} g_{12})}$$

$$V_1 = \begin{pmatrix} a - b \\ g_{21} \end{pmatrix} \text{ and } V_2 = \begin{pmatrix} a + b \\ g_{21} \end{pmatrix}$$

$$M_1 = \frac{V_1}{\sqrt{((a-b)^2 + g_{21}^2)}} \text{ and } M_2 = \frac{V_2}{\sqrt{((a+b)^2 + g_{21}^2)}}$$

where $M_1$ and $M_2$ are transmit filter values for a first user and a second user, respectively, $A_1$ and $A_2$ are channel information received from the receiver, and g, G, a, b, $V_1$ and $V_2$ are temporary variables for determining $M_1$ and $M_2$.

6. A receiver in a multi-user Multiple-Input Multiple-Output (MIMO) communication system, the receiver comprising:
a plurality of antennas for receiving a downlink frame from a transmitter; and
a filter portion for performing channel estimation using a pilot signal of the downlink frame, quantizing a channel matrix of the estimated channel according to a codebook, sending an index indicating the quantized channel matrix, calculating a receive filter value using a transmit filter included in the pilot signal, and calculating an estimate of a received symbol using the receive filter value after receiving data from the transmitter;
wherein the filter portion calculates the estimate of the received symbol by $$\hat{s}_k = F_k^* y_k$$

$$\hat{s}_k = F_k^* \left( \sqrt{\frac{P_o}{2}} H_k \sum_{n=1}^{N} M_n s_n + w_k \right)$$

$$\hat{s}_k = \sqrt{\frac{P_o}{2}} \sum_{n=1}^{N} F_k^* H_k M_n s_n + F_k^* w_k$$

where $y_k$ is the received data, $P_o$ is power, $H_k$ is a channel matrix for a $k^{th}$ receiver, $M_n$ is a transmit filter value for an $n^{th}$ receiver, $s_n$ is a transmitted modulation symbol for the $n^{th}$ receiver, $w_k$ is a vector of Additive White Gaussian Noise (AWGN) with a size $N_k \times 1$ for the $k^{th}$ receiver, $\hat{s}_k$ is the estimate of the received symbol, and $F_k^*$ is the receive filter value normalized for the $k^{th}$ receiver.

7. The receiver of claim 6, wherein the filter portion calculates the pilot signal by $$y_{k,j} = \sqrt{P_t} H_{k,j} M_j + w_{k,j}$$

where k is used to identify the receiver, $y_{k,j}$ is the pilot signal, $H_{k,j}$ is the channel matrix, $M_j$ is the transmit filter, $P_t$ is power, and $w_{k,j}$ is a vector of the AWGN with a size $N_k \times 1$, j is the index of the subcarrier for another user (i.e. a $(k+1)^{th}$ MS).

8. The receiver of claim 6, wherein the filter portion calculates the receive filter value by $$\hat{W}_i = [\hat{W}_{1,i}, \hat{W}_{2,i}]$$

$$F_{1,i} = (\hat{W}_i \hat{W}_i^* + \rho_1 I_{N_i})^{-1} \hat{W}_{1,i}$$

where $\rho_1$ is a Signal-to-Noise Ratio (SNR) of a first receiver, $I_2$ is a 2×2 identity matrix, i is the index of a predetermined subcarrier, $\hat{W}$ is an estimate of the receive filter value, $\hat{W}_{1,i}, \hat{W}_{2,i}$ are estimates of the receive filter value on an $i^{th}$ subcarrier for the first receiver and a second receiver, and $F_{1,i}$ is a receive filter value normalized on $i^{th}$ subcarrier for the first receiver.

9. The receiver of claim 6, wherein the channel matrix is expressed as $$\overline{H} = \frac{H_k^* H_k}{\|H_k\|_{Fro}^2} = \begin{pmatrix} \overline{H}_{k,11} & \overline{H}_{k,12} \\ \overline{H}_{k,21} & \overline{H}_{k,22} \end{pmatrix}$$

where $\overline{H}_{k,21} = \overline{H}_{k,12}^* \cdot \overline{H}_{k,11}$ and $\overline{H}_{k,22}$ are real positive numbers such that $\overline{H}_{k,11} + \overline{H}_{k,22} = 1$, $\overline{H}_{k,12} = \overline{H}_{k,12}^{real} + i\overline{H}_{k,12}^{imag}$ is complex and $\overline{H}_{k,12}^{real}$ and $\overline{H}_{k,12}^{imag}$ are real numbers with absolute values less than 1, and k is the index of the receiver.

10. The receiver of claim 9, wherein the channel matrices have the following entries expressed as $$\overline{H}_{k,11} = \cos^2 \theta_k \text{ and } \overline{H}_{k,22} = \sin^2 \theta_k, \text{ with } 0 \le \theta_k < 90°$$

$$\overline{H}_{k,12} = (\cos^2 \Phi_k) e^{j\phi_k}, \text{ with } 0 \le \Phi_k < 90° \text{ and } 0 \le \phi_k < 360°.$$

11. The receiver of claim 6, wherein the data is expressed as $$y_k = \sqrt{\frac{P_o}{2}} H_k \sum_{n=1}^{N} M_n s_n + w_k$$

where $y_k$ is the received data, $P_o$ is power, $H_k$ is a channel matrix for a $k^{th}$ receiver, $M_n$ is a transmit filter value for an $n^{th}$ receiver, $s_n$ is a transmitted modulation symbol for the $n^{th}$ receiver, and $w_k$ is a vector of the AWGN with a size $N_k \times 1$ for the $k^{th}$ receiver.

12. A reception method of a receiver in a multi-user Multiple-Input Multiple-Output (MIMO) communication system, the reception method comprising:
   acquiring a transmit filter value from a received pilot signal;
   calculating a receive filter value using the transmit filter value; and
   calculating, upon receipt of data, an estimate of a received symbol using the receive filter value;
   wherein the estimate of the received symbol is calculated by $$\hat{s}_k = F_k^* y_k$$
$$\hat{s}_k = F_k^* \left( \sqrt{\frac{P_o}{2}} H_k \sum_{n=1}^{N} M_n s_n + w_k \right)$$
$$\hat{s}_k = \sqrt{\frac{P_o}{2}} \sum_{n=1}^{N} F_k^* H_k M_n s_n + F_k^* w_k$$

where $y_k$ is the received data, $P_o$ is power, $H_k$ is a channel matrix for a $k^{th}$ receiver, $M_n$ is a transmit filter for an $n^{th}$ receiver, $s_n$ is a transmitted modulation symbol for the $n^{th}$ receiver, $w_k$ is a vector of Additive White Gaussian Noise (AWGN) with a size $N_k \times 1$ for the $k^{th}$ receiver, $\hat{s}_k$ is the estimate of the received symbol, and $F_k^*$ is the receive filter value normalized for the $k^{th}$ receiver.

13. The reception method of claim 12, wherein the pilot signal is calculated by $$y_{k,j} = \sqrt{P_t} H_{k,j} M_j + w_{k,j}$$

where k is used to identify the receiver, $y_{k,j}$ is the pilot signal, $H_{k,j}$ is the channel matrix, $M_j$ is the transmit filter, $P_t$ is power, and $w_{k,j}$ is a vector of the AWGN with a size $N_k \times 1$, j is the index of the subcarrier for another user (i.e. a $(k+1)^{th}$ MS).

14. The reception method of claim 12, wherein the receive filter value is calculated by $$\hat{W}_i = [\hat{W}_{1,i}, \hat{W}_{2,i}]$$
$$F_{1,i} = (\hat{W}_i \hat{W}_i^* + \rho_1 I_{N_i})^{-1} \hat{W}_{1,i}$$

where $\rho_1$ is a Signal-to-Noise Ratio (SNR) of a first receiver, $I_2$ is a 2×2 identity matrix, i is the index of a predetermined subcarrier, $\hat{W}$ is an estimate of the receive filter, $\hat{W}_{1,i}, \hat{W}_{2,i}$ are estimates of the receive filter value on an $i^{th}$ subcarrier for the first receiver and a second receiver, and $F_{1,i}$ is a receive filter value normalized on $i^{th}$ subcarrier for the first receiver.

15. The reception method of claim 12, wherein the received data is $$y_k = \sqrt{\frac{P_o}{2}} H_k \sum_{n=1}^{N} M_n s_n + w_k$$

where $y_k$ is the received data, $P_o$ is power, $H_k$ is a channel matrix for a $k^{th}$ receiver, $M_n$ is a transmit filter value for an $n^{th}$ receiver, $s_n$ is a transmitted modulation symbol for the $n^{th}$ receiver, and $w_k$ is a vector of the AWGN with a size $N_k \times 1$ for the $k^{th}$ receiver.

16. A method of a receiver for sending channel information in a receiver in a multi-user Multiple-Input Multiple-Output (MIMO) communication system, the method comprising:
   performing channel estimation using a pilot signal of a received downlink frame;
   quantizing a channel matrix of the estimated channel according to a codebook identical or different for each receiver; and
   sending an index that indicates the quantized channel matrix in the codebook;
   wherein the channel matrix is expressed as $$\overline{H} = \frac{H_k^* H_k}{\|H_k\|_{Fro}^2} = \begin{pmatrix} \overline{H}_{k,11} & \overline{H}_{k,12} \\ \overline{H}_{k,21} & \overline{H}_{k,22} \end{pmatrix}$$

where $\overline{H}_{k,21} = \overline{H}_{k,12}* \cdot \overline{H}_{k,11}$ and $\overline{H}_{k,22}$ are real positive numbers such that $\overline{H}_{k,11} + \overline{H}_{k,22} = 1$, $\overline{H}_{k,12} = \overline{H}_{k,12}^{real} + i\overline{H}_{k,12}^{imag}$ is complex and $\overline{H}_{k,12}^{real}$ and $\overline{H}_{k,12}^{imag}$ are real numbers with absolute values less than 1, and k is the index of the receiver.

17. The method of claim 16, wherein the channel matrices have the following entries expressed as $$\overline{H}_{k,11} = \cos^2 \theta_k \text{ and } \overline{H}_{k,22} = \sin^2 \theta_k, \text{ with } 0 \leq \theta_k < 90°$$
$$\overline{H}_{k,12} = (\cos^2 \Phi_k) e^{j\phi_k}, \text{ with } 0 \leq \Phi_k < 90° \text{ and } 0 \leq \phi_k < 360°.$$

18. A transmission method of a transmitter in a multi-user Multiple-Input Multiple-Output (MIMO) communication system, the transmission method comprising:
   receiving quantized Channel State Information (CSI) and Channel Quality Information (CQI) from a receiver and calculating a transmit filter value using the quantized CSI and the CQI;
   determining an appropriate Adaptive Modulation and Coding (AMC) level for the receiver;
   sending a pilot signal including the transmit filter value and information about the determined AMC level on subcarriers in one of a preamble and data symbols; and
   multiplying a vector of modulated data symbols by the transmit filter value, for data transmission and sending the multiplied data symbols;
   wherein the pilot signal is calculated by $$x_k = M_k \times 1 \times \sqrt{P_t} = \sqrt{P_t} M_k$$

where k is used to identify the receiver and a subcarrier, $x_k$ is the pilot signal, $M_k$ is the transmit filter value, 1 is a known symbol to the transmitter and the receiver, and $P_t$ is transmit power for sending the symbol 1.

19. The transmission method of claim 18, wherein the transmit filter value is calculated by $$\overline{H}_{1,12,q} = \overline{H}_{1,12,q}^{real} + i\overline{H}_{1,12,q}^{imag} \text{ and } \overline{H}_{2,12,q}$$
$$= \overline{H}_{2,12,q}^{real} + i\overline{H}_{2,12,q}^{imag}$$

$$A_1 = \begin{pmatrix} \overline{H}_{1,22,q} & -\overline{H}_{1,12,q} \\ -\overline{H}_{1,12,q}^* & \overline{H}_{1,11,q} \end{pmatrix} \text{ and } A_2 = \begin{pmatrix} \overline{H}_{2,11,q} & \overline{H}_{2,12,q} \\ \overline{H}_{2,12,q} & \overline{H}_{2,22,q} \end{pmatrix}$$

$$G = A_1 A_2 = \begin{pmatrix} g_{11} & g_{12} \\ g_{21} & g_{22} \end{pmatrix}$$

$$a = (g_{11} - g_{22})/2$$

$$b = \sqrt{(a^2 + g_{21} g_{12})}$$

$$V_1 = \begin{pmatrix} a-b \\ g_{21} \end{pmatrix} \text{ and } V_2 = \begin{pmatrix} a+b \\ g_{21} \end{pmatrix}$$

$$M_1 = \frac{V_1}{\sqrt{((a-b)^2 + g_{21}^2)}} \text{ and } M_2 = \frac{V_2}{\sqrt{((a+b)^2 + g_{21}^2)}}$$

where $M_1$ and $M_2$ are transmit filter values for a first user and a second user, respectively, $A_1$ and $A_2$ are channel information received from the receiver and g, G, a, b, $V_1$ and $V_2$ are temporary variables for determining $M_1$ and $M_2$.

20. The transmission method of claim 18, wherein the AMC level determination comprises determining the appropriate AMC level by estimating a Signal-to-Noise Ratio (SNR).

21. The transmission method of claim 20, wherein the SNR is estimated by $$SNR_1 = |M_1^* H_1^* H_1 M_1| \frac{E[|b_1|^2]}{E[|w_1|^2]} = |M_1^* \overline{H}_1 M_1| \frac{E[|b_1|^2]}{E[|w_1|^2]} \|H_1\|_{Fro}^2$$

$$SNR_1 = |M_1^* \overline{H}_1 M_1| \frac{P_{t,1}}{\sigma_1^2} \|H_1\|_{Fro}^2$$

where $P_{t,1}$ is transmit power allocated to a first user, $M_1$ is a transmit filter for the first user, $w_1$ is Additive White Gaussian Noise (AWGN) at the first user, $b_1$ is data for the first user, superscript * denotes a transpose conjugate matrix (or vector) operation, E|| denotes an expected value, $\|H_1\|_{Fro}^2$ represents a squared Frobenius norm of a 2×2 complex matrix $H_1$, $\sigma_1^2$ is a variance of the AWGN at the receiver of the first user, $H_1$ is channel estimation by the first user and $\overline{H}_1$ is statistic estimation for the channel of the first user by the base station.

22. A transmitter for normalizing a transmit filter value in a multi-user Multiple-Input Multiple-Output (MIMO) communication system, the transmitter comprising:
a plurality of antennas for sending and receiving signals; and
a filter portion for monitoring a channel environment of a receiver using the plurality of antennas, calculating a first channel matrix for statistic estimation, calculating a second channel matrix reflecting channel environments of receivers within the coverage of the transmitter using the first channel matrix, normalizing transmit filters for the receivers using the second channel matrix, and sending the normalized transmit filter values;
wherein the filter portion calculates the second channel matrix by $$H_{eff} = \left[ (M_1^* \overline{H}_1)^T \ldots (M_K^* \overline{H}_K)^T \right]^T$$
$$M = H_{eff}^{-1}$$

where $M_K$ is a transmit filter for a $K^{th}$ user, superscript * denotes a transpose conjugate matrix (or vector) operation, and $\overline{H}_K$ is statistic estimation for a channel of the $K^{th}$ user by the base station.

23. The transmitter of claim 22, wherein if the first channel matrix is an average channel matrix, the filter portion calculates an expected value $E[H_k]$ of the average channel matrix, and calculates $E[H_k]^* E[H_k]$ of the average channel matrix.

24. The transmitter of claim 22, wherein if the first channel matrix is a channel covariance matrix, the filter portion calculates an expected value $E[H_k^* H_k]$ for the channel covariance matrix.

25. The transmitter of claim 22, wherein the filter portion normalizes the transmit filters using the second channel matrix by $$M_k = \frac{M_k}{\|M_k\|}$$

where $M_K$ is the transmit filter for the $K^{th}$ user.

26. A method of a transmitter for normalizing a transmit filter in a multi-user Multiple-Input Multiple-Output (MIMO) communication system, the method comprising:
monitoring a channel environment of a receiver and calculating a first channel matrix for statistic estimation;
calculating a second channel matrix reflecting channel environments of receivers within a coverage of the transmitter using the first channel matrix; and
normalizing transmit filter values for the receivers using the second channel matrix;
wherein the second channel matrix calculation includes calculating the second channel matrix by $$H_{eff} = \left[ (M_1^* \overline{H}_1)^T \ldots (M_K^* \overline{H}_K)^T \right]^T$$
$$M = H_{eff}^{-1}$$

where $M_K$ is a transmit filter for a $K^{th}$ user, superscript * denotes a transpose conjugate matrix (or vector) operation, and $\overline{H}_K$ is statistic estimation for the channel of the $K^{th}$ user by the base station.

27. The method of claim 26, wherein if the first channel matrix is an average channel matrix, the first channel matrix calculation includes calculating an expected value $E[H_k]$ of the average channel matrix, and calculating $E[H_k]^* E[H_k]$ of the average channel matrix.

28. The method of claim 26, wherein if the first channel matrix is a channel covariance matrix, the first channel matrix calculation includes calculating an expected value $E[H_k^* H_k]$ for the channel covariance matrix.

29. The method of claim 26, wherein the normalization includes normalizing the transmit filter values using the second channel matrix by $$M_k = \frac{M_k}{\|M_k\|}$$

where $M_K$ is the transmit filter for the $K^{th}$ user.

30. A transmitter in a multi-user Multiple-Input Multiple-Output (MIMO) communication system, the transmitter comprising:
  a filter portion for receiving channel information from a receiver, calculating a transmit filter value using the channel information, determining an appropriate Adaptive Modulation and Coding (AMC) level for the receiver; and
  an antenna for sending a signal including the transmit filter value and information about the determined AMC level;
  wherein the filter portion calculates a pilot signal including a transmit filter value by $$x_k = M_k \times 1 \times \sqrt{P_t} = \sqrt{P_t} M_k$$

where k is used to identify the receiver and a subcarrier, $x_k$ is the pilot signal, $M_k$ is the transmit filter value, 1 is a known symbol to the transmitter and the receiver, and $P_t$ is transmit power for sending the symbol 1.

\* \* \* \* \*